(12) United States Patent
Shimada et al.

(10) Patent No.: US 10,509,161 B2
(45) Date of Patent: Dec. 17, 2019

(54) OPTICAL FIBER

(71) Applicant: SUMITOMO ELECTRIC INDUSTRIES, LTD., Osaka-shi, Osaka (JP)

(72) Inventors: Kensaku Shimada, Osaka (JP); Kazuyuki Sohma, Osaka (JP); Yuya Homma, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/110,132

(22) Filed: Aug. 23, 2018

(65) Prior Publication Data

US 2019/0064434 A1 Feb. 28, 2019

(30) Foreign Application Priority Data

Aug. 29, 2017 (JP) .................. 2017-164434

(51) Int. Cl.
*G02B 6/02* (2006.01)
*C03C 25/326* (2018.01)
*C03C 25/1065* (2018.01)
*C09D 133/14* (2006.01)

(52) U.S. Cl.
CPC ...... *G02B 6/02395* (2013.01); *C03C 25/1065* (2013.01); *C03C 25/326* (2013.01); *C09D 133/14* (2013.01); *C08L 2203/202* (2013.01)

(58) Field of Classification Search
None
See application file for complete search history.

(56) References Cited

U.S. PATENT DOCUMENTS

| | | | | | |
|---|---|---|---|---|---|
| 4,125,644 | A | * | 11/1978 | Ketley | ..................... B05D 7/20 427/498 |
| 4,270,840 | A | * | 6/1981 | Uchida | ............... C03C 25/1065 385/128 |
| 4,875,758 | A | * | 10/1989 | Masuda | ................... G01N 3/08 385/100 |
| 5,416,880 | A | * | 5/1995 | Edwards | ............... C03C 25/106 385/128 |
| 6,026,207 | A | * | 2/2000 | Reddy | ................. C03C 25/1065 385/128 |
| 8,724,956 | B2 | * | 5/2014 | Wu | ..................... C03C 25/1065 385/141 |
| 9,297,950 | B2 | * | 3/2016 | Sohma | .................. C03C 25/106 |

(Continued)

FOREIGN PATENT DOCUMENTS

EP 0745570 A2 12/1996
JP 2014-95923 A 5/2014

(Continued)

*Primary Examiner* — Rhonda S Peace
(74) *Attorney, Agent, or Firm* — Drinker Biddle & Reath LLP

(57) ABSTRACT

An optical fiber includes an optical transmission medium comprising a core and a cladding; a primary resin layer disposed in contact with the optical transmission medium to coat the optical transmission medium; and a secondary resin layer coating the primary resin layer, and 1.1 ppm or less of a phosphorus compound and 2.5% by mass or less of a phenol compound based on the total amount of the primary resin layer are contained in the primary resin layer.

6 Claims, 1 Drawing Sheet

(56) References Cited

U.S. PATENT DOCUMENTS

| | | | |
|---|---|---|---|
| 9,874,684 B2* | 1/2018 | Iwaguchi | C03C 25/24 |
| 10,048,436 B2* | 8/2018 | Homma | C03C 25/105 |
| 10,054,736 B2* | 8/2018 | Iwaguchi | G02B 6/02395 |
| 10,162,108 B2* | 12/2018 | Homma | C03C 25/1065 |
| 2002/0146225 A1* | 10/2002 | Bulters | C03C 25/106 |
| | | | 385/125 |
| 2003/0049446 A1* | 3/2003 | Schissel | C03C 25/106 |
| | | | 428/375 |
| 2003/0215196 A1* | 11/2003 | Bulters | G02B 6/02395 |
| | | | 385/100 |
| 2013/0315545 A1 | 11/2013 | Saito et al. | |
| 2014/0099063 A1* | 4/2014 | Steeman | C03C 25/106 |
| | | | 385/128 |
| 2015/0131956 A1 | 5/2015 | Iwaguchi et al. | |
| 2017/0242187 A1* | 8/2017 | Iwaguchi | C03C 25/1065 |
| 2019/0064434 A1* | 2/2019 | Shimada | G02B 6/02395 |

FOREIGN PATENT DOCUMENTS

| | | |
|---|---|---|
| JP | 2014-132075 A | 7/2014 |
| WO | WO 98/033081 A1 | 7/1998 |
| WO | WO 98/057902 A1 | 12/1998 |
| WO | WO-2014/168201 A1 | 10/2014 |

* cited by examiner

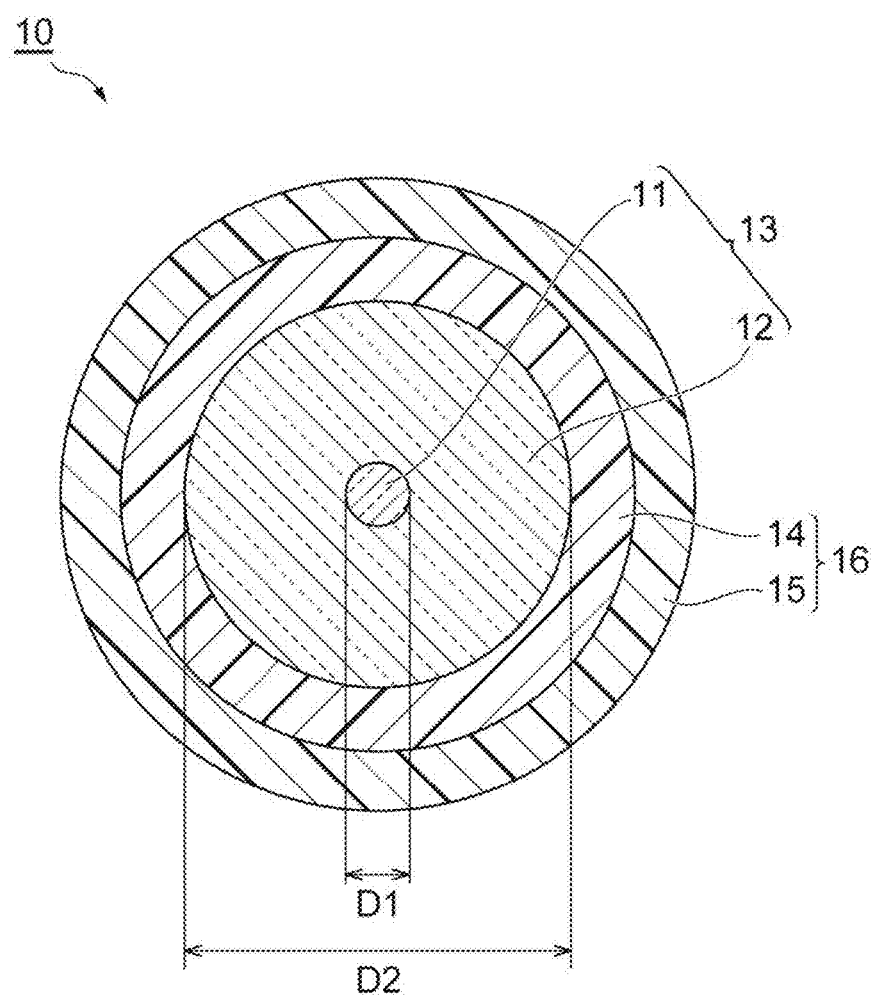

OPTICAL FIBER

TECHNICAL FIELD

The present invention relates to optical fibers.

This application claims a priority based on Japanese Patent Application No. 2017-164434 filed on Aug. 29, 2017, and the entire content described in the Japanese Patent Application is incorporated.

BACKGROUND

Optical fibers generally include coating resin layers for protecting glass fibers which are optical transmission media. For example, JP2014-132075 A and JP2014-95923 A, and WO2014/168201 A1 describe resin compositions for coating optical fibers comprising urethane (meth)acrylate oligomers.

SUMMARY

To minimize an increase in transmission loss induced by microbending generated when lateral pressure is applied to optical fibers, lateral pressure resistance has been required for the optical fibers. Moreover, in the case where the coating resin layer includes a primary resin layer coating an optical transmission medium and a secondary resin layer coating the primary resin layer, a reduction in Young's modulus of the primary resin layer is required to improve the lateral pressure resistance.

A resin composition used to form the coating resin layer is contaminated with an organotin compound, which is a catalyst for synthesizing a urethane (meth)acrylate oligomer. For this reason, a slight amount of tin derived from the organotin compound is contained in the coating resin layer formed by curing the resin composition. In the case where an organotin compound is contained in the coating resin layer, it also acts as a hydrolysis catalyst for urethane bond and ester bond under a hygrothermal environment to facilitate the progression of degradation of the coating resin layer. Because the crosslinking density of the cured resin composition in a primary resin layer having a low Young's modulus, which has recently been desired in view of lateral pressure resistance, is lower than that of conventional resin compositions, the moisture content readily attacks the cured product, further facilitating hydrolysis. If points of stress concentration are generated through uneven scission of crosslinking of the primary resin to generate defects (voids) in the resin, the sizes of such voids will increase at low temperatures to generate microbending in the optical transmission medium, increasing the transmission loss.

Then, an object of the present invention is to provide an optical fiber that includes a coating resin layer having sufficient curability, enables prevention of the generation of voids even if the optical fiber is left under a hygrothermal environment for a long time, and minimizes an increase in transmission loss at low temperatures.

The optical fiber according to one aspect of the present invention includes an optical transmission medium comprising a core and a cladding; a primary resin layer disposed in contact with the optical transmission medium to coat the optical transmission medium; and a secondary resin layer coating the primary resin layer, wherein 1.1 ppm or less of a phosphorus compound and 2.5% by mass or less of a phenol compound based on the total amount of the primary resin layer are contained in the primary resin layer.

According to the present invention, an optical fiber that includes a coating resin layer having sufficient curability, enables prevention of the generation of voids even if the optical fiber is left under a hygrothermal environment for a long time, and minimizes an increase in transmission loss at low temperatures can be provided.

BRIEF DESCRIPTION OF THE DRAWINGS

FIG. 1 is a schematic sectional view illustrating one example of the optical fiber according to the present embodiment.

DETAILED DESCRIPTION

[Description of Embodiment According to the Present Invention]

First, the content of the embodiment according to the present invention will be detailed and described. The optical fiber according to one aspect of the present invention includes an optical transmission medium comprising a core and a cladding; a primary resin layer disposed in contact with the optical transmission medium to coat the optical transmission medium; and a secondary resin layer coating the primary resin layer, wherein 1.1 ppm or less of a phosphorus compound and 2.5% by mass or less of a phenol compound based on the total amount of the primary resin layer are contained in the primary resin layer.

The primary resin layer can be formed by curing an ultraviolet light curable resin composition (hereinafter also simply referred to as "resin composition") comprising a urethane (meth)acrylate oligomer, a monomer, a photopolymerization initiator, a phosphorus compound, and a phenol compound. The urethane (meth)acrylate oligomer is synthesized using an organotin compound as a catalyst, and therefore the resin composition is contaminated with an organotin compound. While the organotin compound is useful as a catalyst when the urethane (meth)acrylate oligomer is synthesized, it also has an action to promote hydrolysis of urethane bond and ester bond under a hygrothermal environment.

Under such circumstances, the phosphorus compound and the phenol compound each function as a substance that inactivates the organotin compound (inactivator). The phosphorus compound can convert the organotin compound to a compound containing a phosphorus atom and a tin atom in the same molecule (a P—Sn compound) to reduce the activity of the organotin compound. The phenol compound can be coordinated with the organotin compound to reduce the activity of the organotin compound. Thus, even if the optical fiber is stored under a hygrothermal environment for a long time, hydrolysis of the resin can be prevented to reduce the generation of voids in the coating resin layer. When the contents of the phosphorus compound and the phenol compound are within the respective ranges mentioned above, a coating resin layer having sufficient curability can be formed.

The phosphorus compound may include diphenylphosphoryl azide and/or methylphosphinic acid. Diphenylphosphoryl azide and methylphosphinic acid each can react with the organotin compound to reduce the activity of the organotin compound.

The phenol compound may include a catechol compound because the activity of the organotin compound can be easily reduced.

The Young's modulus of the primary resin layer may be 0.5 MPa or less at 23° C. Thereby, higher lateral pressure resistance of the optical fiber can be ensured.

[Detailed Description of Embodiment According to the Present Invention]

Hereinafter, specific examples of the optical fiber according to an embodiment of the present invention will be described with reference to the drawings. The present invention will not be limited to these examples, but is defined by WHAT IS CLAIMED IS and intended to include all modifications within the meaning and scope of equivalency of WHAT IS CLAIMED IS. In the following description, identical reference numbers will be given to identical components in the description of drawings, and the duplication of description will be omitted.

(Optical Fiber)

FIG. 1 is a schematic sectional view illustrating one example of the optical fiber according to one embodiment of the present invention. An optical fiber 10 includes an optical transmission medium 13 comprising a core 11 and a cladding 12, and a coating resin layer 16 including a primary resin layer 14 and a secondary resin layer 15, disposed on the outer periphery of the optical transmission medium 13.

The cladding 12 surrounds the core 11. The core 11 and the cladding 12 mainly contain glass such as silica glass; for example, a silica to which germanium is added can be used as the core 11, and pure silica or a silica to which fluorine is added can be used as the cladding 12.

In FIG. 1, for example, the outer diameter (D2) of the optical transmission medium 13 is about 125 μm. The diameter (D1) of the core 11 forming the optical transmission medium 13 is about 7 to 15 μm. The coating resin layer 16 has at least a two-layered structure including the primary resin layer 14 and the secondary resin layer 15. The total thickness of the coating resin layer 16 is usually about 60 μm; the thicknesses of the primary resin layer 14 and the secondary resin layer 15 are substantially identical and the thickness of each layer is 20 to 40 μm. For example, the thickness of the primary resin layer 14 may be 35 μm and the thickness of the secondary resin layer 15 may be 25 μm. In the case where a large number of the optical fibers are bundled to make a cable, the coating diameter of the optical fiber is preferably thin. In this case, the total thickness of the coating resin layer 16 is preferably 30 to 40 μm, and the thickness of the primary resin layer and that of the secondary resin layer each may be 10 to 30 μm. The thickness of the primary resin layer and that of the secondary resin layer may be almost the same.

In view of improving lateral pressure resistance of the optical fiber, the Young's modulus of the primary resin layer is preferably 0.5 MPa or less at 23° C., and may be 0.3 MPa or less or 0.25 MPa or less at 23° C. The lower limit of the Young's modulus of the primary resin layer is not particularly limited, and may be, for example, 0.05 MPa. The Young's modulus of the primary resin layer can be measured by a pullout modulus test at 23° C.

By the way, a higher optical signal to noise ratio (OSNR) is required in the optical fiber to increase the channel capacity per core of a glass fiber by digital coherent communication techniques including multi-modulation technique. Examples of a method for improving the OSNR include a reduction in nonlinearity. For the reduction in nonlinearity, the effective cross-sectional area of the core of the glass fiber is increased as much as possible and low transmission loss is needed. However, the former, i.e., an increase in the effective cross-sectional area of the core means that the optical fiber becomes weak against lateral pressure. In particular, in the case where the effective cross-sectional area of the core exceeds 150 μm², it is preferable that the primary resin layer have a low Young's modulus of 0.25 MPa or less.

In the primary resin layer 14, 1.1 ppm or less of a phosphorus compound and 2.5% by mass or less of a phenol compound based on the total amount of the primary resin layer are contained. The primary resin layer 14 can be formed by curing a resin composition comprising a urethane (meth)acrylate oligomer, a monomer, a photopolymerization initiator, a phosphorus compound, and a phenol compound. In other words, the primary resin layer 14 includes a cured product of a resin composition comprising a urethane (meth)acrylate oligomer, a monomer, a photopolymerization initiator, a phosphorus compound, and a phenol compound.

The phosphorus compound may be added to the resin composition taking the phosphorus compound content of the primary resin layer into consideration, or may be contained as an impurity derived from a raw material such as the photopolymerization initiator in the resin composition. The content of the phosphorus compound is preferably 0.05 to 1.1 ppm, more preferably 0.1 to 1.0 ppm, further preferably 0.1 to 0.8 ppm, based on the total amount of the primary resin layer. When the content of the phosphorus compound is less than 0.05 ppm or more than 1.1 ppm, transmission loss at low temperatures tends to increase. The content of the phosphorus compound in the resin layer can be determined with gas chromatography-mass spectrometry.

Examples of the phosphorus compound include diphenylphosphoryl azide and methylphosphinic acid. When the phosphorus compound includes at least one of diphenylphosphoryl azide and methylphosphinic acid, the activity of the organotin compound can be reduced easily.

The phenol compound is added to the resin composition taking the phenol compound content of the primary resin layer into consideration. The content of the phenol compound is preferably 0.05 to 2.5% by mass, more preferably 0.1 to 2.0% by mass, further preferably 0.1 to 1.5% by mass, based on the total amount of the primary resin layer. When the content of the phenol compound is less than 0.05% by mass, transmission loss at low temperatures tends to increase, and when the content of the phenol compound is more than 2.5% by mass, curability of the primary resin layer tends to decrease.

A catechol compound can be used as the phenol compound. Examples of the catechol compound include catechol, 3-sec-butylcatechol, 3-tert-butylcatechol, 4-sec-butylcatechol, 4-tert-butylcatechol, 3,5-di-tert-butylcatechol, 3-sec-butyl-4-tert-butylcatechol, 3-tert-butyl-5-sec-butylcatechol, 4-octylcatechol, and 4-stearylcatechol. Catechol and 4-tert-butylcatechol are preferred as the phenol compound because of ease of coordination with the organotin compound, and catechol is more preferred.

In the primary resin layer 14, tin derived from the organotin compound used as a catalyst for synthesis of the urethane (meth)acrylate oligomer is contained. The tin content of the primary resin layer 14 is usually approximately 10 to 600 ppm, and may be 10 to 150 ppm. The tin content can be determined by high frequency inductively coupled plasma (ICP) emission spectrometry.

Here, the term (meth)acrylate indicates acrylate or its corresponding methacrylate. The same is true of the term (meth)acrylic acid.

Examples of the urethane (meth)acrylate oligomer include oligomers obtained by reacting a polyol compound, a polyisocyanate compound, and a hydroxyl group-containing (meth)acrylate compound.

Examples of the polyol compound include polytetramethylene glycol, polypropylene glycol, and bisphenol A-ethylene oxide addition diol. Examples of the polyisocyanate compound include 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

An organotin compound is used as a catalyst during synthesis of the urethane (meth)acrylate oligomer. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of availability and catalyst performance, it is preferable that dibutyltin dilaurate or dibutyltin diacetate be used as a catalyst.

A lower alcohol having 5 or less carbon atoms may be used during synthesis of the urethane (meth)acrylate oligomer. Examples of the lower alcohol having 5 or less carbon atoms used during synthesis of the urethane (meth)acrylate oligomer include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

Hereinafter, preparation of the urethane (meth)acrylate oligomer will be described by reference to a specific example. For example, if polypropylene glycol as a polyol, isophorone diisocyanate as a polyisocyanate, 2-hydroxyethyl acrylate as a hydroxyl group-containing (meth)acrylate, and methanol as an alcohol are used, a urethane (meth)acrylate oligomer containing three reaction products shown below can be obtained.

$$H\text{-}I\text{-}(PPG\text{-}I)n\text{-}H \quad (1)$$

$$H\text{-}I\text{-}(PPG\text{-}I)n\text{-}Me \quad (2)$$

$$Me\text{-}I\text{-}(PPG\text{-}I)n\text{-}Me \quad (3)$$

where H represents the residue of 2-hydroxyethyl acrylate, I represents the residue of isophorone diisocyanate, PPG represents the residue of polypropylene glycol, Me represents the residue of methanol, and n represents an integer of 1 or more.

The reaction product (1) is a both-ends reactive oligomer and therefore, the crosslinking density of the cured resin composition is increased; however, the reaction product (2) is a one-end reactive oligomer; therefore, the reaction product (2) has the effect of reducing the crosslinking density of the cured resin composition, and can reduce the Young's modulus. The reaction product (3) is a non-reactive oligomer which causes no curing with ultraviolet light; therefore, it is preferable that preparation be performed such that the reaction product (3) is minimized.

When the urethane (meth)acrylate oligomer is synthesized, a silane coupling agent having a functional group reactive with the isocyanate group may be used. Examples of the silane coupling agent having a functional group reactive with the isocyanate group include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-mercaptopropylmethyldimethoxysilane, and 3-mercaptopropyltrimethoxysilane. If the polyol compound is reacted with the isocyanate compound, the hydroxyl group-containing (meth)acrylate compound and the silane coupling agent are used in combination in the state where an isocyanate group is present on both ends, and are reacted with the isocyanate group, a both-ends reactive oligomer and additionally a one-end silane coupling agent addition oligomer can be synthesized. As a result, because the oligomer can be reacted with glass, the adhesion between the optical transmission medium 13 and the primary resin layer 14 can be enhanced.

As a monomer, a monofunctional monomer having one polymerizable group, or a polyfunctional monomer having two or more polymerizable groups can be used. These monomers may be used in the form of a mixture thereof.

Examples of the monofunctional monomer include (meth)acrylate monomers such as methyl (meth)acrylate, ethyl (meth)acrylate, propyl (meth)acrylate, n-butyl (meth)acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, phenoxyethyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group-containing monomers such as (meth)acrylic acid, (meth)acrylic acid dimers, carboxyethyl (meth)acrylate, carboxypentyl (meth)acrylate, and ω-carboxy-polycaprolactone (meth)acrylate; heterocycle-containing (meth)acrylates such as N-acryloylmorpholine, N-vinylpyrrolidone, N-vinylcaprolactam, N-acryloylpiperidine, N-methacryloylpiperidine, N-acryloylpyrrolidine, and 3-(3-pyridyl)propyl (meth)acrylate; maleimide monomers such as maleimide, N-cyclohexylmaleimide, and N-phenylmaleimide; N-substituted amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, and N-methylolpropane(meth)acrylamide; aminoalkyl (meth)acrylate monomers such as aminoethyl (meth)acrylate, aminopropyl (meth)acrylate, N,N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the polyfunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxy pivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyl diol di(meth)acrylate, 3-ethyl-1,8-octanediol di(meth)acrylate, EO adducts di(meth)acrylate of bisphenol A; trimethylolpropane tri(meth)acrylate, trimethyloloctane tri(meth)acrylate, trimethylolpropanepolyethoxy tri(meth)acrylate, trimethylolpropanepolypropoxy tri(meth)

acrylate, trimethylolpropanepolyethoxypolypropoxy tri(meth)acrylate, tris[(meth)acryloyloxyethyl] isocyanurate, pentaerythritol tri(meth)acrylate, pentaerythritolpolyethoxy tetra(meth)acrylate, pentaerythritolpolypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl] isocyanurate.

The photopolymerization initiator can be appropriately selected from known radical photopolymerization initiators. Examples of the photopolymerization initiator include 1-hydroxycyclohexyl phenyl ketone, 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2,4,4-trimethylbenzoyldiphenylphosphine oxide, 2-methyl-1-[4-(methylthio)phenyl]-2-morpholino-propan-1-one (Irgacure 907, manufactured by BASF SE), 2,4,6-trimethylbenzoyldiphenylphosphine oxide (Irgacure TPO, manufactured by BASF SE), and bis(2,4,6-trimethylbenzoyl)phenylphosphine oxide (Irgacure 819, manufactured by BASF SE).

The resin composition may further contain an amine compound, a silane coupling agent, a photo acid generator, a leveling agent, a defoaming agent, or an antioxidant.

When the resin composition forming the primary resin layer contains the amine compound, the reaction between the phosphorus compound and the organotin compound can be promoted. Examples of the amine compound include trimethylamine, triphenylamine, triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate.

The silane coupling agent is not particularly limited as long as it does not obstruct curing of the ultraviolet light curable resin composition, and a variety of silane coupling agents including publicly known and used silane coupling agents can be used. Examples of the silane coupling agent include tetramethyl silicate, tetraethyl silicate, mercaptopropyltrimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropylbenzothiazyl tetrasulfide. By use of the silane coupling agent, the adhesion between the optical transmission medium 13 and the primary resin layer 14 can be controlled, or dynamic fatigue properties can be improved.

As the photo acid generator, an onium salt having a structure represented by $A^+B^-$ may be used. Examples of the photo acid generator include sulfonium salts such as UVACURE 1590 (manufactured by DAICEL-CYTEC Company, Ltd.), and CPI-100P and 110P (manufactured by San-Apro Ltd.); and iodonium salts such as IRGACURE 250 (manufactured by BASF SE), WPI-113 (manufactured by Wako Pure Chemical Industries, Ltd.), and Rp-2074 (manufactured by Rhodia Japan, Ltd.).

The secondary resin layer 15 can be formed, for example, by curing an ultraviolet light curable resin composition comprising a urethane (meth)acrylate oligomer, a monomer, and a photopolymerization initiator. The urethane (meth)acrylate oligomer, the monomer, and the photopolymerization initiator may be appropriately selected from those listed for the resin composition forming the primary resin layer. However, the resin composition forming the secondary resin layer has a composition different from that of the resin composition foaming the primary resin layer.

The Young's modulus of the secondary resin layer is preferably 500 to 1400 MPa at 23° C., more preferably 800 to 1200 MPa. If the Young's modulus of the secondary resin layer is 500 MPa or more, the lateral pressure resistance is readily improved; if the Young's modulus of the secondary resin layer is 1400 MPa or less, the secondary resin layer has appropriate elongation at break; therefore, the secondary resin layer is difficult to break during removal of the coating, and has high coating removing properties.

A colored layer, which serves as an ink layer, may be formed on the outer surface of the secondary resin layer 15 constituting the coating resin layer 16 in order to distinguish optical fibers. Alternatively, the secondary resin layer 15 may be formed so as to also serve as a colored layer.

The optical fiber according to the present embodiment may be subjected to a heat treatment at a temperature of 40° C. to 85° C. for about 12 to 72 hours. The heat treatment can promote the reaction between the phosphorus compound and the organotin compound. The optical fiber according to the present embodiment may be treated in an atmosphere containing $D_2$ (deuterium) in order to eliminate defects in the optical transmission medium, and when doing so, the heat treatment may be conducted simultaneously.

EXAMPLES

Hereinafter, the results of evaluation tests using Examples and Comparative Examples according to the present invention will be shown, and the present invention will be described more in detail. The present invention will not be limited to these Examples.

(Urethane (Meth)Acrylate Oligomer)

Urethane acrylate oligomers A1, A2, A3, and A4 (A1 to A4) were each prepared by conducting a reaction using polypropylene glycol having a molecular weight of 4000 as a polyol, isophorone diisocyanate as a polyisocyanate, 2-hydroxyethyl acrylate as a hydroxyl group-containing (meth)acrylate, and dibutyltin diacetate as a catalyst. A1 to A4 are oligomers which were prepared using various amounts of the catalyst.

Urethane acrylate oligomer B was prepared by conducting a reaction using polypropylene glycol having a molecular weight of 1000 as a polyol, isophorone diisocyanate as a polyisocyanate, 2-hydroxyethyl acrylate as a hydroxyl group-containing (meth)acrylate, and dibutyltin dilaurate as a catalyst.

(Resin Composition for Primary Resin Layer)

Diphenylphosphoryl azide (DPPA) or methylphosphinic acid (MPPA) as a phosphorus compound and catechol as a phenol compound were mixed with a resin composition prepared by mixing 70.5 parts by mass of any one of urethane acrylate oligomers A1 to A4, 10 parts by mass of isobornyl acrylate, 10 parts by mass of N-vinyl caprolactam, 6 parts by mass of nonylphenoxypolyethylene glycol acrylate, 1 part by mass of 1,6-hexanediol diacrylate, 1 part by mass of 2,4,6-trimethylbenzoyldiphenylphosphine oxide (Irgacure TPO), 0.5 parts by mass of diethylamine, and 1 part by mass of mercaptotrimethoxysilane, to thereby prepare each of resin compositions for forming a primary resin layer shown in Table 1.

(Resin Composition for Secondary Resin Layer)

60 parts by mass of urethane acrylate oligomer B, 19 parts by mass of isobornyl acrylate, 20 parts by mass of trimethylolpropane triacrylate, and 1 part by mass of Irgacure TPO were mixed to obtain a resin composition for forming a secondary resin layer.

[Preparation of Optical Fiber 10]

A primary resin layer 14 having a thickness of 35 μm was formed using a resin composition for a primary resin layer on the outer periphery of an optical transmission medium 13 including a core and a cladding, and having an outer diameter (D2) of 125 μm and an effective cross-sectional area of the core of 150 μm²; and a secondary resin layer 15 having a thickness of 25 μm was further formed on the outer periphery using the resin composition for a secondary resin layer to prepare an optical fiber 10. Further, the optical fiber 10 was subjected to a heat treatment at 40° C. for 12 hours.

[Evaluation of Optical Fiber 10]

The resulting optical fibers were subjected to the following evaluation tests. The results are shown in Tables 1 and 2.

(Tin Content of Primary Resin Layer)

To 1 g of a cured product of the resin composition for a primary resin layer, 20 mL of sulfuric acid/6 mL of nitric acid were added, and the resultant was warmed for 10 minutes. 4 mL of perchloric acid was then added thereto, and the resultant was warmed until insoluble matters disappeared, to thereby prepare a sample. Then, pure water was added to the sample to dilute to 100 mL total, and the tin content of the diluted sample was determined using a high-frequency inductively coupled plasma emission spectrometer.

(Curability of Primary Resin Layer)

The resin composition for a primary resin layer was irradiated with ultraviolet light at 300 mJ/cm² to make a cured resin film, and the resin composition for a primary resin layer was irradiated with ultraviolet light at 30 mJ/cm² to make another cured resin film. The elastic modulus of each of the resin films was determined at 23° C. according to JIS K 7161-1. Then, the ratio of the elastic modulus of the resin film cured by ultraviolet light at 30 mJ/cm² to that of the resin film cured by ultraviolet light at 300 mJ/cm² was calculated. The resin composition was ranked as A when the elastic modulus ratio was 0.85 or more, as B when the elastic modulus ratio was 0.80 or more and less than 0.85, and as C when the elastic modulus ratio was less than 0.80. When the elastic modulus ratio was 0.80 or more, the resin composition was considered to have favorable curability.

(Young's Modulus of Primary Resin Layer)

The Young's modulus of the primary resin layer was measured by a pullout modulus test at 23° C. Specifically, a coating resin layer 16 of the optical fiber 10 was cut with a razor to cut out the coating resin layer 16, and the coating resin layer 16 (primary resin layer 14 and secondary resin layer 15) was fixed and the optical transmission medium 13 was pulled off. The stress of the primary resin layer 14 was determined from the amount of elastic deformation of the primary resin layer 14 before the optical transmission medium 13 was pulled out and the force pulling the optical transmission medium 13.

(Low Temperature Properties after Hygrothermal Degradation)

In the optical fibers degraded at 85° C. and 85% RH for 180 days, the transmission properties of signal light having a wavelength of 1550 nm were measured under two temperature conditions at 23° C. and −40° C. to determine the transmission loss at 23° C. and that at −40° C. The optical fiber was ranked as A when the difference in transmission loss obtained by subtracting the transmission loss at 23° C. from the transmission loss at −40° C. was less than 0.05 dB/km (the transmission loss at −40° C. is smaller), as B when the difference was 0.05 to 0.01 dB/km, and as C when the difference was more than 0.01 dB/km. When the difference in transmission loss was 0.01 dB/km or less, the optical fiber was considered to have favorable low temperature properties.

TABLE 1

|  |  | Unit | Example 1 | Example 2 | Example 3 | Example 4 | Example 5 |
|---|---|---|---|---|---|---|---|
| Primary resin layer | DPPA | ppm | 0.1 | 0.3 | 0.3 | 1.0 | 0 |
|  | MPPA | ppm | 0 | 0 | 0.2 | 0 | 1.0 |
|  | Catechol | % by mass | 0.1 | 0.5 | 1.0 | 2.0 | 2.0 |
|  | Tin | ppm | 30 | 10 | 150 | 100 | 100 |
| Young's modulus of primary resin layer |  | MPa | 0.5 | 0.5 | 0.5 | 0.8 | 0.8 |
| Curability of primary resin layer |  | — | A | A | A | B | B |
| Low temperature properties after hygrothermal degradation |  | — | A | A | A | B | B |

TABLE 2

|  |  | Unit | Comparative Example 1 | Comparative Example 2 | Comparative Example 3 | Comparative Example 4 | Comparative Example 5 |
|---|---|---|---|---|---|---|---|
| Primary resin layer | DPPA | ppm | 1.2 | 0 | 0 | 1.0 | 0 |
|  | MPPA | ppm | 0 | 0 | 0 | 0 | 1.5 |
|  | Catechol | % by mass | 0 | 3.0 | 1.0 | 3.0 | 2.0 |
|  | Tin | ppm | 10 | 10 | 30 | 30 | 30 |

TABLE 2-continued

|  | Unit | Comparative Example 1 | Comparative Example 2 | Comparative Example 3 | Comparative Example 4 | Comparative Example 5 |
|---|---|---|---|---|---|---|
| Young's modulus of primary resin layer | MPa | 0.5 | 1.0 | 0.5 | 1.0 | 0.8 |
| Curability of primary resin layer | — | A | C | A | C | B |
| Low temperature properties after hygrothermal degradation | — | C | B | C | B | C |

It was able to be verified that the optical fibers prepared in the Examples included a coating resin layer having sufficient curability and had low temperature properties after hygrothermal degradation.

What is claimed is:

1. An optical fiber including:
   an optical transmission medium comprising a core and a cladding;
   a primary resin layer disposed in contact with the optical transmission medium to coat the optical transmission medium; and
   a secondary resin layer coating the primary resin layer,
   wherein 1.1 ppm or less of a phosphorus compound and 2.5% by mass or less of a phenol compound based on a total amount of the primary resin layer are contained in the primary resin layer, and
   wherein a tin content of the primary resin layer is 10 to 150 ppm.

2. The optical fiber according to claim 1, wherein the phosphorus compound comprises diphenylphosphoryl azide and/or methylphosphinic acid.

3. The optical fiber according to claim 1, wherein the phenol compound comprises a catechol compound.

4. The optical fiber according to claim 1, wherein content of the phosphorus compound is 0.1 to 1.0 ppm.

5. The optical fiber according to claim 1, wherein a content of the phenol compound is 0.1 to 2.0% by mass.

6. The optical fiber according to claim 1, wherein a Young's modulus of the primary resin layer is 0.5 MPa or less at 23° C.

* * * * *